United States Patent Office 3,336,241
Patented Aug. 15, 1967

3,336,241
PROCESS FOR PREPARING EPOXY COMPOUNDS AND RESULTING PRODUCTS
Edward C. Shokal, Walnut Creek, Calif., assignor to Shell Oil Company, New York, N.Y., a corporation of Delaware
No Drawing. Filed Nov. 12, 1963, Ser. No. 323,084
22 Claims. (Cl. 260—2)

ABSTRACT OF THE DISCLOSURE

A process is disclosed for the treatment of compounds having at least one vic-epoxy group and carbon-to-carbon double bond unsaturation with hydrogen in the presence of a catalyst consisting of rhodium or ruthenium supported on an inert carrier, at a temperature below 50° C. The carbon-to-carbon unsaturation is partially or completely saturated without materially affecting the vic-epoxy group. Lists of compounds to be hydrogenated as well as lists of the resulting products, and reaction conditions such as temperature, amount of catalyst and presence of solvents are disclosed. The resulting hydrogenated products are shown to be curable with conventional epoxy resin curing agents and are disclosed as being useful for preparing adhesives, laminates, castings and moldings.

This invention relates to a new process for preparing epoxy compounds. More particularly, the invention relates to a new process for preparing saturated or substantially saturated epoxy compounds from the corresponding unsaturated epoxy compound, to the resulting new epoxy compounds and to their utilization.

Specifically, the invention provides a new and highly efficient process for converting compounds possessing carbon-to-carbon unsaturation and at least one vic-epoxy group to corresponding compounds which are partially or completely saturated without materially affecting the epoxy group. This new process comprises treating the unsaturated epoxy compound with hydrogen in the presence of a finely divided solid catalyst containing a metal of the group consisting of rhodium and ruthenium preferably supported on an inert carrier, such as carbon, at a temperature below 50° C. As a special embodiment, the invention provides a process for preparing saturated or substantially saturated cycloaliphatic or heterocyclic epoxy compounds, such as for example, glycidyl ethers of cycloalphatic alcohols, which comprises treating the corresponding aromatic or unsaturated heterocyclic epoxy compound with hydrogen in the presence of finely divided rhodium or ruthenium metal supported on a finely divided charcoal or alpha alumina carrier at a temperature above 50° C.

The invention further provides new saturated or substantially saturated epoxy compounds and polymers many of which have never been available heretofore because of the difficulty of their manufacture, and particularly the saturated cycloaliphatic or heterocyclic epoxy compounds and polymers.

The invention further provides new and particularly useful insoluble and infusible cured products obtained by reacting the above-described saturated or substantially saturated epoxy compounds with materials, such as amines, polycarboxylic acids or anhydrides, polymercaptans, hydrazides, metal salts, boron trifluoride and complexes therewith, and the like.

As a special feature the invention provides hydrogenated epoxy ethers of polyhydric phenols which can be cured to give products having surprisingly good resistance to chalking and discoloration caused by exposure to outdoor conditions.

It has been relatively easy heretofore to prepare aromatic epoxy compounds. Aromatic glycidyl ethers, for example, are readily obtained by reacting epichlorohydrin with polyhydric phenols in the presence of caustic. It has been rather difficult, however, to prepare corresponding aliphatic or cycloaliphatic epoxy compounds. The aliphatic and cycloaliphatic compounds are not as reactive toward materials, such as epichlorohydrin, and several steps are required to obtained the desired aliphatic or cycloaliphatic epoxy ethers. In some cases, it is almost impossible to prepare the epoxy compound from the desired aliphatic or cycloaliphatic compound.

It is an object of the invention, therefore, to provide a new process for preparing epoxy compounds. It is a further object to provide a new and highly efficient process for preparing saturated or substantially saturated epoxy-substituted compounds. It is a further object to provide a new technique for preparing epoxy-substituted cycloaliphatic or heterocyclic compounds from the corresponding epoxy-substituted aromatic or unsaturated heterocyclic compound. It is a further object to provide a new process for converting epoxy aromatic compounds to epoxy cycloaliphatic compounds without materially affecting the epoxy group. It is a further object to provide a new group of epoxy compounds which find wide application in industry. It is a further object to provide a process for making epoxy compounds which have improved compatibility with hydrocarbon polymers and resins, paraffinic solvents and the like. It is a further object to provide new hydrogenated epoxy ethers of polyhydric phenol which give cured products having excellent resistance to outdoor conditions. These and other objects of the invention will be apparent from the following detailed description thereof.

It has now been discovered that these and other objects may be accomplished by the process of the invention which comprises treating the compounds possessing carbon-to-carbon unsaturation and at least one vic-epoxy group with hydrogen in the presence of a finely-divided catalyst containing a metal of the group consisting of rhodium and ruthenium preferably supported on an inert carrier, such as charcoal or alpha-alumina at a temperature below about 100° C. It has been surprisingly found that by the use of this special technique that the unsaturated linkages can be selectively hydrogenated leaving the epoxy groups substantially intact. By use of the new process, for example, one is able to convert epoxy compounds, such as glycidyl ether of 2,2-bis(4-hydroxyphenyl)propane, in high yields to the corresponding cycloaliphatic compound, such as the glycidyl ether of 2,2-bis(4-hydroxycyclohexyl)propane. The process is particularly suited for use in the conversion of compounds having aromatic rings as such rings can be completely or partially converted to the cycloaliphatic ring without affecting the epoxy groups. It has been further discovered that the hydrogenated products of the invention and particularly the epoxy ethers of polyhydric phenols, can be cured to form products having outstanding resistance to discoloration and chalking by exposure to outdoor conditions. In this regard they are far superior to the unhydrogenated epoxy compounds.

That the above-described results could be accomplished by such a process was quite surprising in view of the fact that it was expected that the epoxy groups were very sensitive to hydrogenation and that they would be more easily attacked than the aromatic rings. Further, it was expected that catalysts, such as rhodium and ruthenium, were very active hydrogenation catalysts and possessed no selective characteristics as described above.

The compounds that may be converted by the process of the invention include those organic compounds possessing carbon-to-carbon unsaturation and at least one vic-epoxy group. These materials may be monomer or polymeric, and may be substituted with other groups, such as ether, ester, hydroxyl, mercaptan, halogen, carboxyl and the like groups. The compounds may be aliphatic, cycloaliphatic, aromatic or heterocyclic but as noted above, the superior properties are more in evidence when utilizing an aromatic or unsaturated heterocyclic compound. The cyclic compounds may be mono- or polynuclear and may have single or fuzed rings. The epoxy group may be terminal, i.e.,

or internal, i.e.,

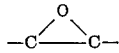

and may have other substituents on the carbons other than hydrogen such as

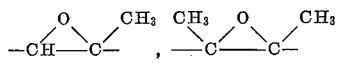

The epoxy group may also be a part of a ring structure, such as

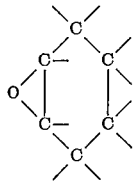

such as in

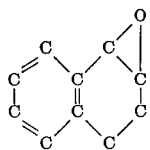

Examples of these compounds include, among others, epoxy-containing aromatic ethers, such as, for example, phenyl glycidyl ether, 3,4-epoxybutyl phenyl ether, diglycidyl ether of resorcinol, diglycidyl ether of 2,2-bis(4-hydroxyphenyl)propane, diglycidyl ether of 2,2-bis(4-hydroxyphenyl)butane, diglycidyl ether of novolac resins obtained by condensing phenol with formaldehyde, glycidyl ether of allylphenol, glycidyl ether of divinylphenol, triglycidyl ether of 1,3,5-trihydroxybenzene, diglycidyl ether of di(hydroxyphenyl)methane, diglycidyl ether of di(hydroxyphenyl)sulfone, and the like. Other examples include glycidyl, di(3,4-epoxycyclohexyl), di(3,4-epoxypentyl) and di(4,5-epoxyoctyl) ethers of the following phenols:

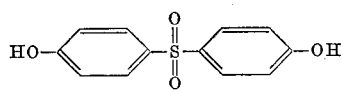

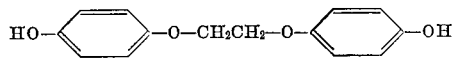

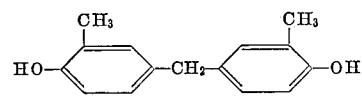

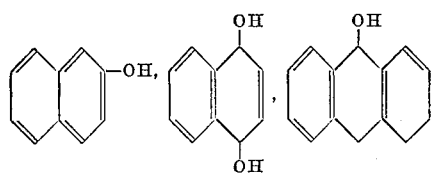

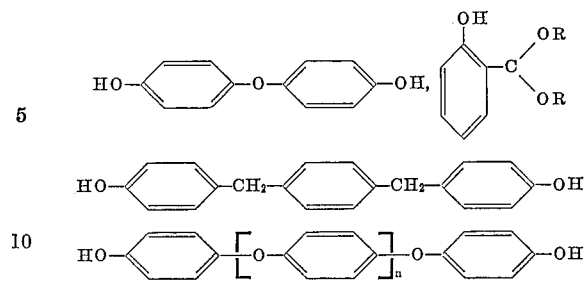

wherein $n$ is 1 to 25. Preferred reactants are the glycidyl ethers of polyhydric phenols containing no more than 30 carbon atoms. Coming under special consideration are the glycidyl ethers of the dihydric phenols of the formula

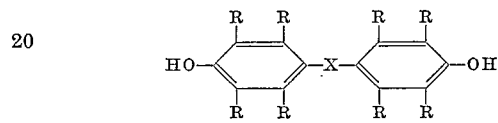

wherein R may be hydrogen, alkyl groups (i.e., 1 to 8 carbon atoms), —OR groups wherein R is alkyl, —COOH, —COOR wherein R is an alkyl group.

Other examples include those having the epoxyalkyl group attached directly to aromatic ring or rings, such as, for example, glycidylbenzene, 1,4-diglycidylbenzene, 1,3,5 - triglycidylbenzene, di(epoxyethyl)benzene, 2,3-epoxybutylbenzene, glycidyl naphthalene, 2,2-bis(3-glycidyl-4-hydroxyphenyl)propane, butyl glycidylbenzoate, ester of ethylene of glycol and glycidylbenzoate, glycidyl aniline, glycidylphenyl allyl ether, glycidyltoluene diisocyanate, amide of diethylene amine and glycidylphthalic acid, and the like.

Examples of other materials include those which have the epoxyalkyl group attached to the aromatic ring or rings through nitrogen such as N,N-diglycidyl aniline, N,N'-diglycidyl methylene dianiline, N,N'-diglycidyl 2,2-bis(4-aminophenyl)propane and the like.

Other examples include compounds wherein the epoxyalkyl group is attached to the aromatic ring or rings through an ester linkage. Examples of such include, among others, diglycidyl phthalate, diglycidyl isophthalate, glycidyl benzoate, epoxidized dicrotyl phthalate, epoxidized dimethallyl phthalate, glycidyl ester of 2,2-di(hydroxyphenyl)-5-pentanoic acid, glycidyl allyl phthalate, glycidyl ester of naphthoic acid, glycidyl pyromellitate, glycidyl ester of trimellitic acid, di(3,4-epoxybutyl)phthalate, di(2,3-epoxycyclohexyl)isophthalate, 3,4-epoxyhexyl benzoate, and the like.

Still other examples include the homopolymers, copolymers, terpolymers, etc. of unsaturated monomers which contain both the epoxy group and aromatic ring or rings. Illustrative examples of these include, among others, polymers of glycidyl ether of vinyl phenol, glycidyl ether of allylphenol, epoxycyclohexyl ether of allyl phenol, epoxycyclohexylmethyl ether of vinyl phenol, acrylic acid ester of glycidyloxy-substituted phenol, methacrylic acid ester of epoxycyclohexyloxy-substituted phenol glycidyl allyl phthalate, glycidyl vinyl isophthalate and epoxy cyclohexyl allyl trimellitate. These polymers include the homopolymers as well as the mixed polymers with dissimilar monomers containing ethylenic linkages which may be any of the above as well as monomers such as, for example, styrene, vinyl chloride, acrylonitrile, vinyl acetate, methacrylonitrile, acrylic acid, methacrylic acid, ethyl acrylate, butyl methacrylate, diallyl phthalate, vinyl methallyl phthalate, divinyl adipate, chloroallyl acetate, vinyl methallyl pimelate, alpha-methylstyrene, butadiene, isoprene ethylene, propylene, isobutylene, vinylidene chloride, acrylamide, and the like, and mixtures thereof.

Other examples include those containing an epoxy group and an unsaturated heterocyclic ring, such as compounds having an epoxy group and one or more furan, thiophene, pyrrole, pyrone, pyridine, indole, quinoline, isoquinoline, dihydropyran and the like rings. Specific examples include, among others, glycidyl ester of 3,4-dihydro-1,2-pyrane-2-carboxylate, 2,3-epoxycyclohexyl 3,4-dihydro-1,2-pyran-2-carboxylate, 3,4-epoxyhexyl 3,4-dihydro-1,2-pyran-2-carboxylate, glycidyl 2,3-dihydrothiophene-2-carboxylate, glycidyl N-methyl 1,2,3,4-tetrahydropyridine-2-carboxylate, glycidyl N-methyl 2,3-dihydropyrrole-2-carboxylate, 2,3-epoxycyclohexyl 2-furoate, glycidyl pyrrole-2-carboxylate, glycidyl 2,3-dihydrofuran-2-carboxylate, glycidyl ether of 3,4-dihydro-1,2-pyran-2-ol, glycidyl ether of 2,3-dihydrothiophene-2-ol, 2,3-epoxycyclohexyl ether of 2,3-dihydrofuran-2-ol, compounds wherein the glycidyl group is attached direct to the furan, thiophenepyrrole, pyrone, pyridine molecules and the like. Also included within this group are the polymers of the above-described monomers such as may be obtained by homopolymerizing or copolymerizing the monomers or interpolymerizing them with other unsaturated monomers, such as, for example, styrene, vinyl chloride, acrylonitrile, vinyl acetate, methacrylonitrile, acrylic acid, ethyl acrylate, butyl methacrylate, diallyl phthalate, vinyl methallyl phthalate, divinyl adipate, alpha-methylstyrene, butadiene, isoprene, ethylene, propylene, isobutylene, acrylamide and the like.

Still other examples include those materials, preferably of the polymeric type, wherein the epoxy group and the aromatic or unsaturated heterocyclic ring or rings do not appear in the same unit but do appear in the same molecule. Examples of these include, for instance, copolymers of allyl glycidyl ether and styrene, allyl glycidyl ether and alpha-methylstyrene, terpolymers of butadiene, allyl glycidyl ether and p-methylstyrene, copolymers of glycidyl acrylate and styrene, terpolymers of allyl alcohol, glycidyl acrylate and styrene, copolymers of glycidyl methacrylate and allyloxy ether of phenol, copolymers of glycidyl cyclohexanecarboxylate and allyl ether of 2,2-bis(4-hydroxyphenyl)propane, terpolymer of vinyl acetate, allyl glycidyl ether and N-allyl aniline, terpolymer of allyl glycidyl ether, styrene and vinyl acetate and the like.

Still other examples include condensation polymers containing epoxide groups as side or terminal groups and aromatic groups as part of the molecule. Phthalic (or iso or tere) acid condensations with glycols or amines with excess acid give products with carboxylic groups that further react with epichlorohydrin to form glycidyl derivitives, hydroxy benzoic acid polyol or polyamine condensation products further reacted with epichlorohydrin (glycols, glycerol, pentaerythritol, ethylene diamine, diethylene triamine are examples of polyols and amines).

Less preferred materials to be used in the process of the invention include those containing epoxy groups and unsaturation of the aliphatic or cycloaliphatic type. Examples of these include, among others, butadiene monoepoxide, vinyl cyclohexene monoepoxide, allyl glycidyl ether, cyclohexenyl glycidyl ether, copolymers of butadiene and allyl glycidyl ether, copolymers of butadiene and glycidyl acrylate, copolymers of methylpentadiene and epoxycyclohexyl acrylate, copolymers of methylpentadiene and epoxycyclohexyl acrylate, copolymers of cyclopentadiene and glycidyl methacrylate, partially epoxidized polybutadiene, partially epoxidized copolymers of butadiene and allyl alcohol, partially epoxidized copolymers of butadiene and styrene, partially epoxidized terpolymers of butadiene, acrylonitrile and styrene, and the like.

The process of the invention comprises treating the above-described compounds or polymers possessing the epoxy group and unsaturation with hydrogen in the presence of a finely-divided rhodium or ruthenium catalyst supported on an inert carrier at a temperature below 150° C. The hydrogenation catalyst consists of rhodium or ruthenium metal or a compound of rhodium or ruthenium in a finely divided state e.g., 50 mesh or less and preferably 800–1200 mesh. The surface area of the catalyst as compared to that of a sphere will be large. The greater the area, the more efficient the catalyst. The rhodium and ruthenium metal or compounds can be used alone or supported by an inert carrier to increase its surface area. By inert carrier is meant one that is nonreactive with epoxide compounds with or without the catalyst. Metal oxides of aluminum, zirconium, titanium, calcium, silicon, magnesium, tin, molybdenum, and iron are useful. Carbon and carbides as silicon carbide, boron carbide, are useful as carriers.

Particularly preferred carriers are those of relatively low surface area, e.g., those having an area of less than 50 square meters per gram. Examples of these include alpha-alumina, oxides of zirconium, titanium and magnesium.

The amount of the catalyst to be employed may vary over a considerable range. In general, the amount of the catalyst (metal) will vary from about .1% to about 10% by weight of the epoxy-containing compound. Preferred amounts of catalyst range from about .5% to about 5% by weight.

The temperature employed during the reaction will be below 100° C. Preferred temperatures range from ambient temperature to about 50° C. Temperatures above the 100° C. bring about a loss in epoxy group and should not be employed if high epoxy values are desired.

The hydrogen pressure preferably employed varies from about 50 to 800 p.s.i., although higher pressures such as those up to or over 2000 p.s.i. may be employed. Particularly preferred pressures vary from about 10 to 500 p.s.i.

The hydrogenation is preferably accomplished in an inert solvent, such as dioxane, tetrahydrofuran, cyclohexane, isopropyl alcohol, ethers, mixed ether alcohols of polyols or mixtures of inert solvents, and the like, and mixtures thereof. The amount of the solvent employed preferably varies from 50 to 90%. However, with low viscosity systems the solvent can be reduced or completely eliminated.

In most cases, the hydrogen is rapidly absorbed under the conditions of the reaction and the reaction time is relatively short. In general, reaction times vary from about 1 hour to about 24 hours depending on the conditions and material being hydrogenated. The reaction can be stopped at any time if only partial hydrogenation is desired as noted hereinafter.

The reaction may be stopped by conventional means, such as reducing temperature, killing or removal of the catalyst, addition of an inhibitor and the like. The catalyst may be removed by filtration or centrifugation and the solvents or diluents removed by distillation. In some cases, it may be desirable to leave the solvent or diluent in the mixture and use the combined mixture in the intended application.

The resulting products in purified form will vary in physical form from free flowing liquids to solids depending on the starting material. In chemical structure, they will have the same structure as the starting material with the exception that the carbon-to-carbon unsaturation will be converted to a saturated carbon-to-carbon linkage in the desired degree. For most applications, it is desired to effect a substantially complete conversion of the unsaturated linkages to saturated linkages. However, in some cases, it may be desirable to effect only a partial, e.g., 20% to 85%, conversion of unsaturated linkages to the saturated linkages.

The products will also have substantially the same number of epoxy groups as the starting material and can be further reacted through the epoxy group to form a variety of different types of derivatives and polymers. These epoxy compounds, for example, can be reacted with amines, thiols, $H_2S$, HCl, HBr, HI, acids and the like. The epoxy compounds which have more than one epoxy group may be reacted with epoxy curing agents to form hard insoluble infusible castings. The curing agents for the products include materials which are preferably acidic or alkaline. Examples of suitable curing agents include among others, the polybasic acids, such as, for example, the di-, tri- and higher carboxylic acids as oxalic acid, phthalic acid, terephthalic acid, succinic acid, alkyl and alkenyl-substituted succinic acids, tartaric acid, and particularly the polymerized unsaturated acids, such as, for example, those containing at least 10 carbon atoms, and preferably more than 14 carbon atoms, as for instance dodecenedioic acid, 10,12-eicosadienedioic acid, teradecenoic acid, linoleic acid, linolenic acid, eleostearic acid and licannic acid. Particularly preferred acids are the trimerized acids, obtained from the ethylenically unsaturated fatty acids as derived from semi-drying and drying oils, and particularly the conjugated fatty acids containing from 12 to 20 carbon atoms.

Other preferred curing agents include the amino-containing compounds, such as, for example, diethylene triamine, triethylene tetramine, dicyandiamide, melamine, pyridine, cyclohexylamine, benzyldimethylamine, benzylamine, diethylamine, triethanolamine, piperidine, tetramethylpiperazine, N,N-dibutyl - 1,3-propane diamine, N,N-diethyl-1,3-propane diamine, 1,2-diamino-2-methylpropane, 2,3-diamino-2 - methylbutane, 2,3 - diamino - 2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2-methylpiperidine, 2,6-dimethylpiperidine, diaminopyridine, tetramethylpentane, metaphenylene diamine and the like, and soluble adducts of amines and polyepoxides and their salts, such as described in U.S. 2,651,589 and U.S. 2,640,037. Still other examples include the acetone soluble reaction products of polyamines and monoepoxides, the acetone soluble reaction products of polyamines with unsaturated nitriles, such as acrylonitrile, imidazoline compounds as obtained by reacting monocarboxylic acids with polyamines, sulfur and/or phosphorous-containing polyamines as obtained by reacting a mercaptan or phosphine containing active hydrogen with an epoxide halide to form a halohydrin, dehydrochlorinating and then reacting the resulting product with a polyamine, soluble reaction products of polyamines with acrylates, and many other types of reaction products of the amines.

Still other curing agents that may be used include the polycarboxylic acid anhydrides, such as, for example, the pyromellitic anhydride, phthalic anhydride, succinic acid anhydride, maleic acid anhydride, boron trifluoride and complexes of boron trifluoride with amines, ethers, phenols and the like, Friedel-Crafts metal salts, such as aluminum chloride, zinc chloride, and other salts, such as zinc fluoborate, magnesium perchlorate and zinc fluosilicate; inorganic acids and partial esters as phosphoric acid and partial esters thereof including n-butyl orthophosphite, diethyl orthophosphate and hexaethyltetraphosphate and the like.

Another type of curing agent to be employed includes the polyamides containing active amino and/or carboxyl groups, and preferably those containing a plurality of amino hydrogen atoms. Examples of polybasic materials used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and trimerized fatty acids as described above. Amines used in making the polyamides include preferably the aliphatic and cycloaliphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40° C., and preferably 20 to 250 poises at 40° C. Preferred polyamides also have amine value of 50 to 450.

Still another group of curing agents are those based on melamine reaction products containing methylol substituents.

The amount of curing agent may vary considerably depending upon the particular agent employed. For the alkalies or phenoxides, 1% to 4% is generally suitable With phosphoric acid and esters thereof, good results are obtained with 1 to 10% added. The tertiary amine compounds are preferably used in amounts of about 1% to 15%. The acids, anhydrides, polyamides, polyamines, polymercaptans, etc., are preferably used in at least 0.8 equivalent amounts, and preferably 0.8 to 1.5 equivalent amounts. An equivalent amount refers to that amount needed to give one active H (or anhydride group) per epoxy group.

The compositions of the invention may be prepared by a variety of different methods. All of the components may be mixed together in any order, or they may be mixed together in separate groups.

Solvents or diluents may also be added to make the composition more fluid or sprayable. Preferred solvents or diluents include those which are volatile and escape from the polyepoxide composition before or during cure such as, esters as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, such as glycidyl phenyl ether, glycidyl allyl ether, glycidyl acrylate, glycidyl cyclopentyl ether, diglycidyl ether, glycidyl ether of glycerol and the like, and mixtures thereof.

Other materials may also be added to the composition as desired. This includes other types of polyepoxides such as described in U.S. 2,633,458. This also includes fillers, as sand, rocks, resin particles, graphite, asbestos, glass or metal oxide fillers and the like, plasticizers, stabilizers asphalts, tars, resins, insecticides, fungicides, stabilizers, antioxidants, pigments, stains, and the like.

The temperature employed in the cure will vary depending chiefly on the type of curing agent. The amino-containing curing agents generally cure at or near room temperature and no heat need be applied. The acids, anhydrides and melamine derivatives, on the other hand, are generally used with heat, such as temperatures ranging from 150° F. to about 400° F. Preferred temperatures range from about 200° F. to about 400° F. and more preferably from about 250° F. to 350° F.

The compositions containing the polyepoxides and curing agents may be used for a variety of important applications. They may be used, for example, as adhesives for metal, wood, concrete, plaster and the like, and as surface coatings for various types of surfaces. The new compositions may also be used in the preparation of laminates or resinous particles reinforced with fibrous textiles. They may also be used in the formation of castings and moldings and for the encapsulation of electrical equipment.

As noted above, the new epoxy compounds, and particularly those derived by hydrogenating epoxy ethers of polyhydric phenols, can be cured to form products having outstanding resistance to discoloration and chalking by outdoor conditions. As a result, the new products are particularly suited for use as surface coatings, such as paints, lacquers, enamels and the like, and especially those intended for outdoor use. In these applications, the new epoxy compounds are preferably mixed with a curing agent such as amine or anhydride, a solvent or diluent, pigment, etc. and then the resulting mixture spread out on the desired surface to dry. Heat may be applied to accelerate the cure.

The new polyepoxides may also be used to produce higher molecular weight products as by reaction with controlled amounts of polyhydric phenols, such as Bisphenol-A, hydroquinone and the like. In this way, high mole weight products terminating either in epoxy groups or phenol groups can be prepared.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise indicated, parts described in the examples are parts by weight. The polyethers referred to by letter are those in U.S. 2,633,458.

*Example I*

250 parts of dioxane purified by refluxing over caustic, fractionating in a $N_2$ atm. and containing less than 5 p.p.m. $O_2$ was added to a glass hydrogenation bottle containing 25 parts (0.073 mole) of the diglycidyl ether of 2,2-bis(4-hydroxyphenyl)propane. Four grams of finely-divided catalyst (10% rhodium or carbon) approximately 800–1200 mesh, and after all the air was replaced with $N_2$, and the $N_2$ replaced with hydrogen, the hydrogen pressure was raised to 50 p.s.i.g. and shaking started and kept at room temperature.

After 22 hours of hydrogenation, 0.5 mole of hydrogen had been consumed. The catalyst was removed by filtration under $N_2$ and the dioxane removed by vacuum distillation. The product, 20 g., remaining as bottoms was a water white liquid which analyzed as follows:

Product epoxy content _____ 0.390 eq./100 g.
Starting material epoxy content _____ 0.587 eq./100 g.

66.5 mole percent of the original epoxy groups were recovered unchanged. An infrared analysis of the undiluted product between NaCl plates showed no absorption at 6.2 microns showing that no aromatic components were left. The starting material has a strong absorption at 6.2 microns.

11% by weight of diethylene diamine added to a portion of this product converted it into a hard tough infusible resin on standing overnight at room temperature.

*Example II*

The procedures and quantities of reagents in Example I were repeated with the exception that the rhodium catalyst recovered from Example I was used instead of a fresh batch.

After 10.5 hours of hydrogenation 0.41 mole of hydrogen was absorbed and continuing the hydrogenation for another 1½ hours did not increase the hydrogen absorption. The product was recovered as described in Example I. It analyzed as follows: Epoxy content, 0.530 eq./100 g.

91.3% of the original epoxy groups were recovered unchanged. Infrared analysis of the undiluted product between NaCl plates showed no absorption at 6.2 microns showing that no aromatic components were left.

By comparing Examples I and II and data below it becomes apparent that the selectivity of the catalyst improves with use. The active sites that have the least selectivity are deactivated quite rapidly so that subsequent use of the catalyst gives a product with a greater epoxy retention. Epoxy retentions over 95% have been obtained in some instances.

11% by weight of diethylene diamine added to a portion of this product converted it into a hard tough infusible resin on standing overnight at room temperature.

In a similar manner the polyglycidyl ethers of $\alpha,\alpha,\alpha',\alpha',\alpha'',\alpha''$-hexakis(hydroxyphenyl) 1,3,5-triethyl benzene, $\alpha,\alpha,\alpha',\alpha'$-tetrakis(hydroxyphenyl)ethane and $\alpha,\alpha,\alpha',\alpha'$-tetrakis(hydroxymethylphenyl)ethane can be hydrogenated with the catalyst.

*Example III*

A stainless steel stirred autoclave was charged with 125 parts of a polyglycidyl ether of a phenol formaldehyde condensate dissolved in 800 parts of purified dioxane. 25 parts of a finely divided catalyst comprising 5% rhodium or carbon (approximately 800–1200 mesh) recovered from a previous hydrogenation was added in a $N_2$ atmosphere, the $N_2$ replaced with $H_2$ and brought to 100 p.s.i.g. $H_2$ and 50° C. Moderate stirring was used. The hydrogenation was stopped after 1.65 moles or 85% of the theoretical hydrogen needed to saturate all the aromatic rings was absorbed. The catalyst was removed by filtration under $N_2$ and 105 g. of product; a thick light yellow liquid was recovered as bottoms by vac distilling off the dioxane. It had an epoxy value of 0.513 eq./100 g. or 91.5% of the original value 0.560 eq./100 g. An infrared analysis using the 6.2 microns absorption band as a reference confirmed the 85% hydrogen absorption measured.

These hydrogenated products can be obtained as aromatics completely converted to cycloaliphatics as a mixture of aromatic and cycloaliphatic groups, depending on how much $H_2$ is used. It may be a distinct advantage in some applications to only partially hydrogenate the aromatic groups.

11% by weight of diethylene diamine added to a portion of this product converted it into a hard tough infusible resin on standing overnight at room temperature.

*Example IV*

This experiment was run so that the partially hydrogenated product could be studied in surface coating applications.

125 parts of diglycidyl ether of 2,2-bis(4-hydroxyphenyl)propane was dissolved in 1000 parts of purified dioxane and under a $N_2$ blanket charged to a stainless steel autoclave equipped for stirring. 12.5 parts of a finely divided catalyst comprising 10% rhodium or carbon approximately 800–1200 mesh was added, the $N_2$ replaced with hydrogen and the pressure raised to 100 p.s.i.g. and the temperature to 50° C. The hydrogenation, with stirring was run for one hour at which time 1.20 moles of $H_2$ had reacted. This calculates to 54% of the theoretical amount of $H_2$ needed to hydrogenate all the aromatic rings to cycloaliphatic rings. The catalyst was filtered off in a $N_2$ atmosphere and the product recovered as 127 parts of bottoms by vac distilling off the dioxane. It was a water white liquid having 8 poise viscosity and an epoxy value of 0.552 eq./100 g. which is 94.0% of the starting value.

*Example V*

A quantity of about 50% hydrogenated product having an epoxy diglycidyl ether of 2,2-bis(4-hydroxyphenyl)propane value of 0.54 eq./100 g. was milled on a three roll paint mill with commercial $TiO_2$ until a fine dispersion and wetting was obtained. The resulting milled mixture contained 40% weight $TiO_2$, 11% weight of diethylene triamine was stirred in and with an .006 inch doctor blade tin panels were coated and cured 15 min. at 100° C.

The entire precedure above was repeated using the same batch of diglycidyl ether of 2,2-bis(4-hydroxyphenyl)propane which was not hydrogenated. Both sets of panels were masked ½ off with a foil and put in an Atlas Color Fade-O-Meter and periodically observed. The unhydrogenated panels quickly developed a yellow color, particularly on the uncovered half. After 20 hours the hydrogenated panels were left in because no visable change was observable. The exposure was continued 200 hours at which time very little if any change in color, gloss or chalking developed. Thus, a very light resistant pigmented surface coating resulted from the partial hydrogenation of the diglycidyl ether of 2,2-bis(4-hydroxyphenyl)propane. Completely hydrogenated diglycidyl ether also has excellent resistance to light when formulated into a surface coating.

In a similar way coatings can be made by combining the hydrogenated diglycidyl ether with urea-formaldehyde and melamine resins.

*Example VI*

This example illustrates the advantage of having an inert support for the rhodium metal. The entire procedure and reagents were duplicated as described in Example IV with the exception that the hydrogenation was not limited to a partial hydrogenation and the catalyst was 21 parts of finely divided 5% rhodium on beta-alumina having 103 sq. meters per g. surface area. Samples were withdrawn during the hydrogenation so that the oxirane group could be measured. The below table illustrates that there was much less selectivity with this catalyst.

| Time, hr. | Moles $H_2$ Consumed (percent of theory needed to hydrogenate all aromatic groups) | Oxirane Value of Solvent Free Reaction Product, eq./100 g. |
|---|---|---|
| 2.5 | .96 (43.5%) | 0.254 or 43.3% of original value. |
| 3.6 | 1.10 (50%) | 0.164 or 23% of original value. |
| 5.8 | 2.63 (120%) | 0.060 or 10% of original value. |

An infrared analysis using the 6.2 micron band for reference showed complete hydrogenation of the aromatic ring.

*Example VII*

This experiment was run in every way the same as Example IV with the exceptions that the catalyst was 25 parts of 5% palladium on carbon and the hydrogenation continued longer. After 4.75 hours 0.75 mole (35% of that needed to hydrogenate the aromatic rings) of $H_2$ had reacted and the oxirane value dropped to 0.006 eq./100 g. of 1% of the original value. An additional 1.5 hour of hydrogenation did not change these values significantly.

*Example VIII*

This experiment was run in every way the same as Example VII except the catalyst was 25 parts of finely divided 5% ruthenium on carbon.

After 24 hours 0.38 mole of $H_2$ had reacted and the oxirane value was 92% of the original value. After an additional 24 hours of hydrogenation 0.66 mole of $H_2$ had reacted and the epoxide value was 81% of the original value. The hydrogenation was terminated after 72 hours when the total $H_2$ uptake was 0.72 mole and the oxirane value was 0.36 eq./100 g. or 61% of original value.

*Example IX*

125 parts of partially polymerized diglycidyl isophthalate was dissolved in purified dioxane and charged under a blanket of $N_2$ into a stainless steel autoclave. 25 parts of a finely divided catalyst comprising 10% rhodium on carbon approximately 800-1200 mesh was added, the $N_2$ replaced with $H_2$ and hydrogenation proceeded at 50° C. and 100 p.s.i.g. with moderate stirring. The hydrogenation was stopped when 1.0 mole of $H_2$ was reacted or 77% of the calculated value to hydrogen the aromatic rings. Five samples taken during this period showed that the oxirane value did not drop below 91% of the original value.

The hydrogenated product of partially polymerized diglycidyl isophthalate is a water white liquid having Gardner viscosity of 5 to 6.

*Example X*

*Part A.*—125 parts of diglycidyl ether of 2,2-bis(4-hydroxyphenyl)propane was dissolved in 1000 parts of purified dioxane and charged under $N_2$ into stainless steel stirred autoclave. 12.5 parts of a finely divided catalyst recovered from a previous run (10% rhodium on carbon) was added, the $N_2$ replaced with $H_2$ and the $H_2$ pressure brought to 100 p.s.i.g. and heated to 50° C. With moderate stirring the hydrogenation was continued until no more $H_2$ was taken up, this took 3 hours. The product was recovered by filtering off the catalyst under $N_2$ and the dioxane removed by vac flash distillation. A quantitative recovery of water white product was obtained with an epoxy value of 0.513 eq./100 g. or 87% of the original value. Infrared analysis using the 6.2 micron absorption as reference showed no aromatic groups.

*Part B.*—The above experiment was repeated using 11.1 parts of the catalyst recovered from Part A. In 5 hours, the hydrogen reaction stopped and the bottoms product, a water white liquid recovered. It had an epoxy value of 0.526 eq./100 g. or 90.2% of the original value. It had a Gardner viscosity of 7 poise and showed no aromaticity when analyzed by infrared.

A tough casting having a Barcol hardness of 30–32 was obtained by mixing equal weights of the hydrogenated product with Nadic methyl anhydride and .5% triphenyl phosphine, and heating 150° for 2 hours.

The hydrogenated product has an unusually long pot life with amines, yet it gives a good hard strong casting when cured at room temperature. 6.99 g. of hydrogenated diglycidyl ether was mixed with 0.79 g. of diethylene diamine and poured into an aluminum cup. It could be still easily poured after 8 hours and 45 minutes and became difficult to pour after 10 hours. When allowed to cure at room temperature overnight it was hard. After 48 hours, it had a Barcol hardness of 12 and was tough and water white.

*Example XI*

25 parts of the glycidyl ester of 3,4-dihydro-2H-pyrane-2-carboxylate was dissolved in oxygen free purified dioxane and put into a stainless steel stirred autoclave protected with an $N_2$ blanket. 2 parts of a finely divided catalyst comprising 5% rhodium on carbon approximately 800–1200 mesh, the $N_2$ replaced with $H_2$ and the $H_2$ pressure brought up to 50 p.s.i.g. and kept at room temperature. In one hour and 30 minutes, 0.16 mole of hydrogen had reacted (95% of the calculated amount necessary to saturate the pyrane ring). The reaction product was fractionated and 22.5 parts of high boiling liquid recovered overhead. It showed no unsaturation by analysis and had an oxirane value of 0.48 (89% of its original value).

*Example XII*

25 parts of a glycidyl polyether of 2,2-bis(4-hydroxyphenyl)propane having a molecular weight of 900 and an epoxy value of 0.199 eq./100 g. (Polyether D in U.S. 2,633,458) was dissolved in 420 parts of dioxane and charged under nitrogen into a stainless steel stirred autoclave. 5 parts of a finely divided catalyst made up of 5% rhodium on carbon was added, and the nitrogen replaced with hydrogen. The hydrogen pressure was brought to 100 p.s.i.g. and the mixture heated to 50° C. With moderate stirring the hydrogenation was continued until no more hydrogen was taken up. This took 7 hours. The product was recovered by filtering off the catalyst under nitrogen and the dioxane removed by vacuum flash distillation. A light yellow solid was recovered. The resulting finished product had an epoxy value of 0.185 eq./100 g., which calculates to 93% of the original value. The aromatic ring reduction using 6.2 micron references band is estimated to be 85%.

Example XIII

This example illustrates the preparation of cyclohexyl glycidyl ether from phenyl glycidyl ether.

52 parts of phenyl glycidyl ether was dissolved in 415 parts of isopropyl alcohol and the mixture charged under nitrogen into a stainless steel autoclave. 5 parts of a finely divided catalyst recovered from a previous run (10% rhodium on carbon) was added, nitrogen replaced with hydrogen and the hydrogen pressure brought to 100 p.s.i.g. and heated to 50° C. With moderate stirring the hydrogenation was continued until no more hydrogen was taken up, this took about 3 hours. The product was recovered by filtering off the catalyst under nitrogen and the dioxane removed by vacuum flash distillation. A water white liquid identified as cyclohexyl glycidyl ether was recovered. The product had 95% retention of the epoxide content and the aromatic content (6.3 micron band) dropped below 5%. It had a pleasant odor in dilute concentrations.

Example XIV 250 parts of purified dioxane was added to a glass hydrogenation vessel containing 25 parts of diglycidyl aniline. Four parts of a finely divided catalyst (10% rhodium on carbon) was added, and after all the air was replaced with nitrogen, and the nitrogen replaced with hydrogen, the hydrogen pressure was raised to 50 p.s.i.g. and shaking started and kept at room temperature.

After the theoretical amount of hydrogen had been consumed, the catalyst was removed by filtration under nitrogen and the dioxane removed by vacuum distillation. The remaining product was a liquid identified as N,N-diglycidyl aminocyclohexane.

The above product when heated at 100° C. with diethylene triamine, sets up to form a hard solid casting.

Example XV 410 parts of purified dioxane was added to the hydrogenation vessel containing 25 parts of a copolymer of allyl glycidyl ether and styrene having a molecular weight of 780 and an epoxy value of 0.546 eq./100 g. 5 parts of a finely divided catalyst (10% rhodium on carbon) was added, and after all the air was replaced with nitrogen, and the nitrogen replaced with hydrogen, the hydrogen pressure was raised to 50 p.s.i.g. and shaking started and kept at room temperature.

After about 3 moles of hydrogen had been consumed, the catalyst was removed by filtration under nitrogen and the dioxane removed by vacuum distillation. The remaining product was identified as a corresponding copolymer of allyl glycidyl ether and vinyl cyclohexane. It had less than 5% of the original aromatic groups as estimated from its infrared systems using the 6.2 micron band as referred.

The above product when heated at 100° C. with diethylene triamine sets up to form a hard solid casting.

Example XVI 250 parts of purified dioxane was added to the hydrogenation vessel containing 39 parts of epoxidized dicrotyl isophthalate having an epoxy value of 0.60 eq./100 g. 5 parts of the finely divided catalyst made up of 10% rhodium on carbon was added to the vessel, and after all the air had been removed as in the preceding examples, hydrogen was introduced under pressure of 50 p.s.i.g. and the vessel shaking at room temperature.

After about 0.40 mole of hydrogen had been consumed, the catalyst was removed by filtration under nitrogen and the dioxane removed by vacuum distillation. The remaining product was identified as epoxidized dicrotyl cyclohexanedicarboxylate.

The above product when heated at 100° C. with diethylene triamine sets up to form a hard solid casting.

Example XVII

The preceding example was repeated with the exception that the polyepoxide employed was epoxidized dimethallyl isophthalate. The product obtained in this case was identified as epoxidized dimethallyl cyclohexanedicarboxylate. The resulting product can be cured with diethylene triamine to form hard insoluble castings.

Example XVIII 250 parts of the purified dioxane was added to the hydrogenation vessel containing 52 parts of glycidyl ether ester of diphenolic acid. 5 parts of a finely divided catalyst made up of 10% rhodium on carbon approximately 800–1200 mesh was added, and after all the air was replaced as in the preceding examples, hydrogen pressure was raised to 50 p.s.i.g. and shaking started and kept at room temperature.

After 0.59 mole of hydrogen had been consumed, the catalyst was removed by filtration under nitrogen and the dioxane removed by vacuum distillation. The remaining product was identified as a glycidyl ether ester of 3,3-di(4-hydroxycyclohexyl)pentanoic acid.

Example XIX

The preceding example was repeated with the exception that the unsaturated epoxy compound is glycidyl ether of 2-glycidylphenol. The resulting product is a white liquid having an epoxy value of .456 eq./100 g.

Example XX 400 parts of dioxane, purified by refluxing over caustic, distilling and keeping covered with pure $N_2$, was charged into a stainless steel autoclave containing 52 parts of diglycidyl ether of 2,2-bis(4-hydroxyphenyl)propane which was also protected with pure $N_2$. When the solution was complete 50 parts of a catalyst was added that consisted of 0.86% rhodium on powdered alpha-alumina. This catalyst had a surface area of 13 sq. meters/gram as measured by $N_2$ absorption. X-ray measurements showed the support to be predominantly alpha-alumina.

The vessel was flushed with pure $N_2$ and then the $N_2$ replaced with $H_2$ and the pressure brought up to 380 p.s.i. at 25° C. and stirring started. After about 3 hours at 25° C. and 20 hours at 50° C. .99 moles of $H_2$ was absorbed and the reaction stopped. The catalyst was filtered off and the product recovered by distilling off the solvent. 50 parts of water white product remained in the distillation flask that analyzed 0.146 eq./100 g. epoxide, and 0.40 eq./100 g. hydrogel. The 6.2 absorption band showed 95+% of the aromatic groups were hydrogenated.

Example XXI

The above example was repeated using catalyst (0.86% rhodium on alpha-alumina) recovered from previous hydrogenations. The hydrogenation was run for 2.25 hrs. at 100 to 420 p.s.i. and 35–70° C. When the product was worked up spectroscopic analysis, using the 6.2 micro band for reference, showed complete hydrogenation of the aromatic rings. The oxirane content (analyzed by reaction with HCl) of the water white product was 93% of the original value. This example shows how the catalyst improves in rate and selectivity after a preconditioning.

The catalyst preconditioning can be done in part by treating the catalyst for several hours under pressure of hydrogen with or without the use of solvent and elevated temperatures.

I claim as my invention:

1. A process for preparing new epoxy compounds which comprises treating an organic compound possessing at least one vic-epoxy group and at least one carbon-to-carbon double bond unsaturation with hydrogen in the presence of a finely-divided catalyst containing a metal of the group consisting of rhodium and ruthenium at a temperature below about 150° C.

2. A process for preparing substantially saturated epoxy compounds which comprises reacting an organic compound possessing at least one vic-epoxy group and at least one carbon-to-carbon double bond unsaturation with hydrogen in the presence of a rhodium-containing catalyst supported on an inert carrier, said carrier being inert toward the reaction with epoxide compound and also being inert toward epoxide rings when in the presence of the catalyst, at a temperature below 150° C.

3. A process as in claim 2 wherein the catalyst is rhodium metal supported on carbon.

4. A process as in claim 2 wherein the catalyst is rhodium metal supported on alpha-alumina.

5. A process as in claim 2 wherein the hydrogenation is conducted at a temperature between 15° C. and 150° C. and at a hydrogen pressure of 10 p.s.i.g. to 1000 p.s.i.g.

6. A process as in claim 2 wherein the catalyst is a rhodium metal-rhodium oxide mixture supported on carbon.

7. A process as in claim 2 wherein the unsaturated epoxy compound is an epoxy ether of a polyhydric phenol.

8. A process as in claim 2 wherein the unsaturated epoxy compound is an epoxy ester of an aromatic polycarboxylic acid.

9. A process as in claim 2 wherein the unsaturated epoxy compound is an epoxyalkyl-substituted aromatic compound wherein the epoxyalkyl group is attached to the ring through carbon.

10. A process as in claim 2 wherein the unsaturated epoxy compound is a N - epoxy - substituted aromatic amine.

11. A process as in claim 2 wherein the unsaturated epoxy compound is a polymer of an alkenyl epoxyalkyl ether and an aromatic unsaturated compound.

12. A process as in claim 2 wherein the inert carrier is finely-divided carbon.

13. A process as in claim 2 wherein the unsaturated epoxy compound is a polymer of an ester of an epoxyalkanol and a carboxylic acid and an aromatic unsaturated compound.

14. A process as in claim 2 wherein the unsaturated epoxy compound is a glycidyl ether of 2,2-bis(4-hydroxyphenyl)propane.

15. A process as in claim 2 wherein the unsaturated epoxy compound is a copolymer of allyl glycidyl ether and styrene.

16. A process as in claim 2 wherein the unsaturated epoxy compound is a glycidyl ester of an aromatic polycarboxylic acid.

17. A process as in claim 2 wherein the unsaturated epoxy compound is phenyl glycidyl ether.

18. A process as in claim 2 wherein the unsaturated epoxy compound is a glycidyl ether of a phenol-formaldehyde condensate.

19. A process as in claim 2 wherein the unsaturated epoxy compound is a partially epoxidized polybutadiene.

20. A process as in claim 2 wherein the unsaturated epoxy compound is diepoxyethylbenzene.

21. A process for preparing substantially saturated epoxy compounds which comprises reacting an organic compound possessing at least one vic-epoxy group and at least one carbon-to-carbon unsaturation with hydrogen in the presence of a rhodium metal supported on an inert carrier, said carrier being inert toward the reaction with epoxy compounds and also being inert toward epoxy compounds in the presence of the aforementioned catalyst, at a temperature below 150° C.

22. A process as in claim 21 wherein the catalyst is rhodium metal supported on alpha-alumina.

No references cited.

WILLIAM H. SHORT, *Primary Examiner.*

T. PERTILLA, *Assistant Examiner.*